United States Patent [19]
Keller, Jr.

[11] Patent Number: 4,873,207
[45] Date of Patent: * Oct. 10, 1989

[54] CERAMIC AGGREGATE FOR ROADWAY COMPOSITION AND METHOD OF PRODUCING SAME

[76] Inventor: Fred Keller, Jr., 1410 Winston Cir., Bethlehem, Pa. 18017

[*] Notice: The portion of the term of this patent subsequent to Apr. 26, 2005 has been disclaimed.

[21] Appl. No.: 189,665

[22] Filed: May 3, 1988

Related U.S. Application Data

[63] Continuation-in-part of Ser. No. 143,587, Jan. 13, 1988, Pat. No. 4,780,433, which is a continuation-in-part of Ser. No. 924,891, Oct. 30, 1986, Pat. No. 4,740,486.

[51] Int. Cl.$^4$ ............... C04B 20/00; C04B 33/22; C04B 38/06
[52] U.S. Cl. ............... 501/80; 501/81; 501/82; 501/83; 106/93; 106/97; 428/312.6; 428/316.6; 264/43; 264/44
[58] Field of Search ............ 501/80, 81, 82, 83; 106/93, 97; 428/312.6, 316.6; 264/43, 44

[56] References Cited

U.S. PATENT DOCUMENTS

| | | | |
|---|---|---|---|
| 3,776,748 | 12/1973 | Richards | 106/97 |
| 4,050,949 | 9/1977 | Lundgren et al. | 106/97 |
| 4,740,486 | 4/1988 | Keller, Jr. | 501/83 |
| 4,780,433 | 10/1988 | Keller, Jr. | 501/80 |

Primary Examiner—William R. Dixon, Jr.
Assistant Examiner—David M. Brunsman
Attorney, Agent, or Firm—Steele, Gould & Fried

[57] ABSTRACT

A ceramic aggregate for concrete is made from a mixture of clay and dried organic garbage in a ratio of about three parts by volume of organic garbage to about one part by volume clay. The mixture is shaped into pancake-shaped pellets and fired at a temperature in excess of the vitrification point of the clay to cause the surface of the pellets to melt and harden the pellets.

9 Claims, 1 Drawing Sheet

CERAMIC AGGREGATE FOR ROADWAY COMPOSITION AND METHOD OF PRODUCING SAME

Cross Reference to Related Applications

This application is a continuation-in-part of copending application serial number 143,587, filed Jan. 13, 1988, now U.S. Pat. No. 4,780,433, which is a continuation in part of application serial number 924,891, filed Oct. 30, 1986, and now U.S. Pat. No. 4,740,486.

BACKGROUND OF THE INVENTION

1. Field of the Invention

This invention relates to methods and materials for building structures, especially durable wear surfaces such as paved roads, and more particularly to a settable composition based on an aggregate having lightweight ceramic bodies of a disk-like shape, which are mixed with a binder for building roadways and the like.

2. Description of the Prior Art

There are many compositions available for use in constructing roadways. Two main categories are those with a bituminous base and those made with a settable binder such as resin or Portland cement. Both types normally include aggregates such as basalt, flint, granite, limestone, and other ground or chipped rock aggregate. The aggregate particles may be sorted for diameters appropriate for the required use; however, the aggregate is simply broken and/or sorted and no attempt is made to employ any particular shape for the rock pieces.

Some compositions have been developed with the objective of improving the hardness and durability of the materials used in roadways. U.S. Pat. No. 3,776,748 to Richards teaches production of discrete artificial road paving stones by combining a granular aggregate made of silica and clay with Portland cement. The granular aggregate is not fired but is hardened in an autoclave. Lundgren et al. in U.S. Pat. No. 4,050,949 discusses the use of steel disks as an added structural means to reinforce concrete, as opposed to steel wires or the like.

Additionally, aggregates have been used in the production of non-roadway compositions for both decorative and practical reasons. In U.S. Pat. No. 3,078,175 to DeLisle, Terrazo tiles and similar bodies are created by crystalizing a mix of cement and aggregates to form slugs. The slugs are then crushed into random-shaped pieces of the required diameters and compressed to form the tiles.

It is known that powdered or granular aggregates may be added to cementitous products with various results. For example, in the making of concrete bodies, it is known that shale and limestone may be combined with cement and the composition heated until the gases from the limestone cause the mixture to expand. The expanded mixture is then cooled to produce a relatively lighter weight concrete body than would result using inert aggregates. This lightweight cement product is typically formed into blocks. Its surface hardness is not affected by any discrete aggregate pieces included in the mixture.

In related. U.S. Patent Applications Ser. No. 143,587 (U.S. Pat. No. 4,780,433) and Ser. No. 924,891 (U.S. Pat. No. 4,740,486, which are hereby incorporated by reference, I disclosed an inexpensive, lightweight ceramic material to be mixed with cement and which increased the thermal insulation qualities of the cement. The ceramic is added in the form of a crushed aggregate of inexpensive and plentiful clays and organic wastes, mixed and fired to the point of vitrification. The resulting ceramic bodies are left with numerous insulating air pockets at spaces where the organic constituents are burned away during firing. During production the green ceramic, including the organics, is formed into beads or is rolled into sheets or similar forms. The forms are fired and then crushed to create random shapes for aggregate pellets, grains, or similar crushed aggregate.

The present invention uses specially formed aggregate bodies that are not crushed. Preferably the aggregate bodies of the invention are fired beyond vitrification to the point of creating a crystalline glaze on the surface of the beads, whereupon the aggregate pieces are hardened such that with wear of the roadway, or other structure made from the aggregate, the hardened pieces become exposed on the surface, with beneficial results. If the shape of the aggregate is made such that the aggregate bodies are readily layered, especially as a flattened disc, the aggregate is extremely useful in a cement binder composition for roadways.

Comminuted garbage pellets produced from commercial refuse treatment plants are an excellent source of organic material for the aggregate, which organic material is burned out substantially during firing. Therefore, the paving material not only produces a very durable roadway, but consumes undesirable material in the process. During firing of the green ceramic bodies, the organic constituents (i.e., the garbage pellets) also contribute as fuel, reducing the fuel otherwise required, and possibly being adequate for supporting the firing process at certain stages thereof.

Although much prior art is devoted to producing stronger and more durable roadway compositions, the prior art does not lead to manufacturing rock-like ceramic bodies for use with a binder. On the contrary, the conventional wisdom is to break up larger rocks to produce the desired size aggregate bodies. The clay and pelletized garbage, according to the invention, produce a light-weight ceramic aggregate and, when added to a cement binder, produce an economical yet durable roadway composition while at the same time offering an ecologically and economically sound method of using and disposing of organic refuse materials.

SUMMARY OF THE DISCLOSURE

Certain problems of the aforementioned prior art are obviated by the composition for building roadways of this invention. Lightweight ceramic aggregate pellets replace commonly used gravel or stone aggregate in concrete used on roadways. The aggregate is formed by mixing vitreous clay with shredded or pelletized preferably-dried organic material, especially comminuted household garbage, in a ratio of about three parts by volume of organic material such as garbage to about one part by volume clay. The mixture is formed into pancake-shaped pellets, for example using rollers with convex depressions, and is fired to a temperature greater than the vitrification point of the clay (preferably about 100 degree F. above). The organics open spaces in the green ceramic. During firing the organic matter substantially burns away, leaving open the spaces in the fired pancake-shaped pieces and thus reducing their density while improving thermal insulation properties. At the high preferred firing temperature, the pellet surface tends to melt, resulting in a light weight aggregate body with increased surface hardness. By using preprocessed organic garbage as an ingredient in the aggregate, the aggregate is economical to produce and fly ash is removed from the environment. The aggregate bodies, when included in paving materials, become exposed on the surface with wear, reducing the effects of traffic and weather on the roadway.

It is, therefore, an object of this invention to produce an economical aggregate for use with a binder for paving roadways which utilizes processed garbage.

It is another object of this invention to provide an aggregate with increased hardness for better durability of roadways.

It is a further object of this invention to provide an aggregate pellet which is very lightweight and thus is especially useful in paving bridges and in other structures involving supported planar elements.

It is still another object of this invention to provide aggregate pellets which, because of their rounded edges and pancake shape, readily flow into stratified overlapping layers to create a grained concrete having improved load bearing and friction-resistant characteristics at least along certain planes.

It is yet a further object of this invention to provide an aggregate pellet which has a melted surface or crust for increased strength and lower porosity.

These and other objects will be more readily ascertainable to one skilled in the art from a consideration of the following Figures, description and exemplary embodiments, with the understanding that the drawings are illustrative only and that changes may be made in the specific construction illustrated and described within the scope of the appended claims.

BRIEF DESCRIPTION OF THE DRAWING(S)

DETAILED DESCRIPTION OF THE PREFERRED EMBODIMENT(S)

Figure 1:
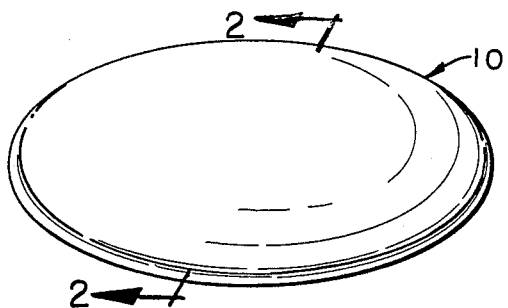
FIG. 1 is a perspective view of a disk-shaped ceramic aggregate particle for use in the material according to the invention.

The invention concerns a particular ceramic body of particular use in aggregates to be combined with a binder. The binder can be Portland cement, a resinous binder or a bituminous material, however, Portland cement is preferred. A plurality of pancake-shaped bodies are formed according to a particular procedure resulting in a light-weight ceramic pancake 10 as shown in FIG. 1. The pancake is lightweight by virtue of a plurality of gaps which remain in the body of the fired ceramic material due to the burning away of organic materials in the green mix. Furthermore, the pancake is preferably fired to a temperature somewhat beyond the initial point of sintering, whereby external surfaces tend to become glazed. A large number of these lightweight ceramic pancakes are used as an aggregate material instead of, or in addition to, other conventional forms of aggregates, namely crushed stone. The particular size of pancake 10 chosen for a given application will vary somewhat on the application, in the same manner as the average size of conventional stone particles are varied in connection with known aggregates. However, unlike known aggregates, the pancake or disk-like shape of the aggregate bodies according to the invention allow the bodies to rest in stratified, overlapping layers, providing a very durable material, especially as compared to the weight of the material.

Previous patent application serial numbers 143,587, filed Jan. 13, 1988 and 924,891 filed Oct. 30, 1986, disclose a number of variations in composition of clay, methods of production, and organic additives that are useful in production of the present aggregate. The contents of said applications are incorporated herein. In connection with the present application, it is necessary to produce a strong aggregate that is very inexpensive in order to improve upon known aggregates formed of crushed and sorted rock. Processing of clay material and firing it is likely to be of comparable expense to that of mining, crushing, and sorting of rock pieces. However, according to the invention, superior structural characteristics as well as a further contribution to the economy of the material is found in the use of pelletized organic garbage for as much as three-fourths of the volume of the mix. Consumers pay disposal services to make use of garbage, and in the present case, the pelletized garbage is not an undesirable component, but contributes substantially to the beneficial attributes of the aggregate.

Preferably, the aggregate is formed of a common brick clay and dried organic garbage in a ratio of about three parts by volume of organic garbage to about one part by volume of clay. This mixture is shaped into disk-like pellets, preferably the pancake shown in FIGS. 1 and 2, and fired at a temperature in excess of the vitrification point of the clay. The clay can be a shale brick clay or a tile clay. Stoneware clays and other clays will also work, however, higher temperatures may be required in firing. Surface brick clays will function adequately having a vitrification temperature of about 1,600–2,000 degrees F. (870°–1100° C.), as compared to vitrification temperatures for stoneware clays of about 2,300 to 2,700 degrees F. (1250°–1500° C.).

Additives can be added to the clay in order to improve strength. Naturally occurring clays are seldom exactly perfect for producing any particular bodies. Some additional ceramic chemicals may be desirable in order to affect the characteristics of the resulting ceramic bodies. Some additional materials that are known in the art to have useful properties in firing of clay for making bricks and the like are also helpful in the present material. These materials may affect the ease of molding or other handling, the vitrification temperature, the density of the material or the like. Inasmuch as forming will be required in order to mold the mixed clay and pelletized garbage material into disk-like bodies, a binder may also be appropriate for forming the green ceramic into the required shape. In connection with additives, the user may add additional quantities of ball clay, barium carbonate, iron oxide, calcium carbonate (limestone), dolomite, as well as organic binders such as methyl-cellulose, which will burn out in firing. Test aggregates have been found to vitrify at under 2,000 degrees F. (1100° C.) using a composition of 40 percent local shale clay and 60 percent Ohio ball clay, to which 2 percent barium carbonate by weight was added. One part by volume of this clay mixture is added to two parts by volume of pelletized garbage, preferably produced in a conventional garbage comminution plant, and allowed to dry.

Figure 2:
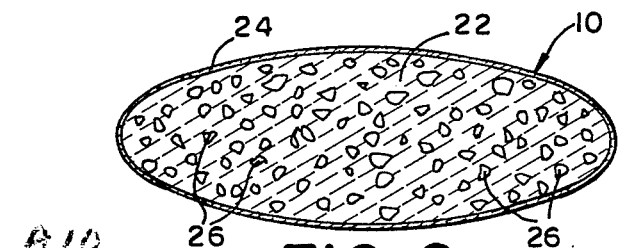
FIG. 2 is a sectional view taken along lines 2-2 in FIG. 1.
Figure 3A:
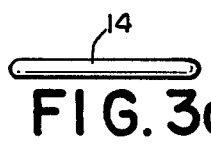
FIGS. 3a and 3b are side elevation views of alternative embodiments of the disk-like body.
Figure 3B:
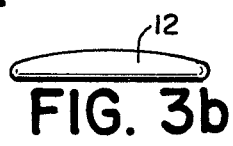
Figure 3C:
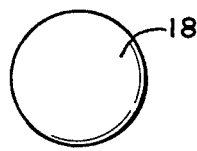
FIGS. 3c and 3d are elevation views of alternative embodiments thereof.
Figure 3D:
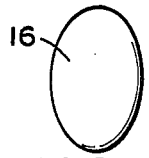

The green ceramic mixture, including clays and garbage, is formed into pancake shapes, for example using a roller having a roller having a plurality of convex depressions. The roller may be opposed by a second roller having complementary convex depressions in registry with the first roller, whereby symmetrical disks 10 are produced as shown in FIGS. 1 and 2, having a substantially elliptical cross-section. It is also possible to oppose a roller or other forming mechanism with a flat surface, providing a more or less flat disk having a rounded side and an opposite flat side, as shown in disk 14 in FIG. 3a and disk 12 in FIG. 3b. It is also possible, as shown in FIGS. 3c and 3d, to form the pancake as a symmetrical round object, as disk 18, an elongated ovoid, as disk 16, or to make it some other shape, such as rectangular with rounded corners. Preferably, for ease of production, and for better durability and resistance to cracking and chipping, the embodiments according to FIGS. 1, 2, 3b and 3c are presently preferred.

The dimensions of the disk-like shapes can be varied as required according to the particular structural job or paving operation. Preferably, in connection with heavy duty wear surfaces such as roadways, the disks are formed to 2-4 centimeters in diameter with an elliptical cross section characterized by approximately twice the thickness in the middle as the thickness adjacent the ends of the ellipse.

The green ceramic pieces are fired to a temperature of at least about 100 degrees above the vitrification point. This forms a desirable surface glazing or crust, which improves strength of the disk-like bodies and lowers their porosity.

Preferably, the bodies are fired using a continuous belt process, however, it is also possible to arrange the process for firing in batches. During firing, some sagging of the individual ceramic bodies will occur, however, the disks will remain substantially flat and capable of overlapping one another in a stratified orientation, as shown with disks 10 in FIG. 4. The disk like bodies can be handled as an aggregate in the same manner as random-shaped crushed rock aggregates. Preferably, however, the aggregate including disk-like bodies according to the invention is handled after firing in a manner that will ensure stratification of the disks and allow them to overlap, substantially improving the strength of the resulting material.

Figure 4:
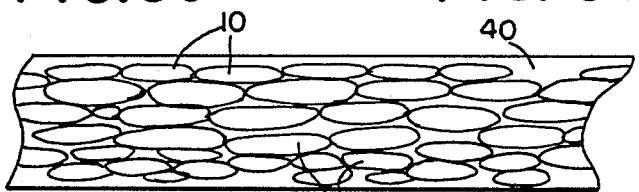
FIG. 4 is a partial section view through a set aggregate and binder structure according to the invention.

Frequently a failure mode of concrete aggregate/binder structures is that a crack will occur between the binder and the aggregate bodies, due in part to a failure of bonding and in part to the different thermal cycling characteristics of the aggregate as compared to the binder. In the present case, provided the disk-like bodies are arranged to overlap one another, as shown in FIG. 4, a grain is produced, running in a stratified orientation of disks 10 in binder 40, and lacking any vertically oriented path through binder 40 in which a crack could proceed along a straight line including the edges of the disk-like aggregates. The overlapping of disks 10 prevents such a straight line from being defined. While the disk-like bodies will to some extent assume a stratified shape of their own, this effect can be increased by agitating the bodies, causing them to settle with a minimum of interstices, i.e., the individual disks all being aligned substantially horizontally and parallel to each other.

Figure 5:
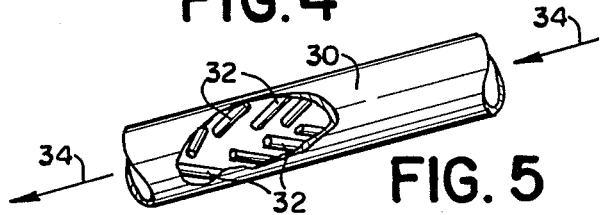
FIG. 5 is a partial cut-away perspective view of a means for feeding the aggregate of the invention.

An alternative means for improving the stratification of the disk-like bodies shown in FIG. 5. A tube 30, through which the aggregate bodies are to be passed, preferably along with a binder material, is provided with a plurality of inward-facing obstruction members 32, past which the disks must slide in order to pass through pipe 30. The obstructions 32 extend transversely into the lumen of tube 30 and also are inclined in the direction of flow, indicated by arrows 34. Obstructions 32 do not reach the clear across the tube, being spaced from the far wall on their distal ends by at least the thickness of a disk, and thereby avoiding trapping the disks as would occur should obstruction rods 32 extend fully across the opening in tube 30. Preferably, a plurality of rods 32 are provided in an outlet orifice tube such as the nozzle of an aggregate pumping arrangement, by which the paving material is placed.

The external surfaces of the disks 10 of the aggregate are similar to the surfaces of bricks, having a hard and abrasive ceramic surface, possibly provided with a glazed or melted external layer. FIG. 2, which shows a cross section, illustrates a glazed external layer 24. A plurality of openings 26 are dispersed throughout clay 22 which occupies the remaining volume of aggregate particle 10. Certain of the openings 26 will occur at the surface, however, for the most part the openings are evenly distributed throughout the body. The organic particle size, and hence the size of openings 26, should be sufficiently small and evenly dispersed to avoid a situation in which successive openings 26 are immediately adjacent one another in a plane traversing the aggregate body, which would define a weakened shear plane.

FIG. 4 illustrates a paved roadway or the like incorporating ceramic bodies 10. A binder 40 carries the bodies and, in keeping with conventional concrete formations, the uppermost of the ceramic bodies 10 is, with a new pour, covered over with binder 40 such that the aggregates are not exposed. With wear, however, the surface binder 40 is abraded away, leaving the surfaces of the disks 10 exposed at the upper surface. Disks 10 being quite wear resistant, the effect of wear to the point of exposure of disks 10 is to cause further abrasion to be born substantially by the disks rather than by the binder, the binder occupying a relatively smaller proportion of the exposed surface area as the wear proceeds.

Although the aggregate pellets can be added to any cementitious premix, it has been found that mixing three parts by volume of the ceramic aggregate pellets with one part by volume dry cement and two parts by volume granular sand or other grog is especially suitable. The preferred aggregate pellets are formed by mixing one part vitreous clay by volume with three parts processed shredded and dried organic garbage mulch by volume, the pellets then fired to a point slightly higher than the vitrification point of the clay to cause the pellet surface to harden. It is preferred that the percentage of organic garbage in each aggregate pellets be about 72% of the finished product. It is also preferred that the pellets be rounded with their ends having a height one half as great as the height of the pellet's longitudinal midpoint. The rounding of the edges and flattening of one surface enhance the stratifying capabilities of the pellets. In mixing the final concrete product for roadways, it is preferred that the mix (water having been added as is practiced in the art) be pour by forcing the newly formed concrete through a nozzle having inwardly protruding obstructions to urge the pellets into longitudinal alignment. This alignment results in a roadway having stratified layers running parallel to the road surface.

The invention has been described in connection with preferred embodiments involving paving and roadways. It will be appreciated that another use of the pancake aggregate is inexpensive modular building construction. Simple snap-together metal forms can be laid out adjacent a building site and filled with pancake aggregate concrete, which upon setting, provide a structurally supporting panel member. After the concrete cures, the metal forms are removed and the light-weight insulate pieces can be put together using a frame.

It is presently preferred that the aggregate pancakes be of relatively small diameter, for example, several centimeters. This is considered to be an appropriate size in connection with paving, and to facilitate handling of the aggregate, pancakes of this size flowing easily upon tilting of containers such as dump trucks, wheelbarrows and the like. It is also possible to arrange a similar aggregate using larger or smaller pancake pieces. In each case the point is to have the pancakes wide and flat enough to overlap one another in a stratified formation as shown in FIG. 4, whereupon a large proportion of the cast structure is occupied by light-weight ceramic bodies, which due to their vitrification have strong integrally supporting characteristics and as so connected to one another form a very strong overall structure.

A number of additional variations will now occur to persons skilled in the art made aware of this disclosure. Reference should be made to the amended claims rather than to the foregoing specification as indicating the true scope of the invention.

What is claimed is:

1. A ceramic aggregate for concrete constructions comprising a mixture of clay and dried organic garbage in the ratio of about three parts by volume of organic garbage to about one part by volume clay, said mixture shaped into pellets and fired at a temperature in excess of the vitrification point of said clay.

2. The ceramic aggregate according to claim 1 wherein said clay is a mixture of shale clay and ball clay in the ratio of about forty percent shale clay by volume to about sixty percent ball clay by volume.

3. The ceramic aggregate according to claim 2 further comprising at least one additive selected from the group consisting of barium carbonate, iron oxide, limestone, and dolomite in the amount of about two percent additive by volume.

4. The ceramic aggregate according to claim 1 wherein said pellets are generally elliptical, flattened on a bottom surface and rounded on a top surface, the height at the ends of said ellipse being approximately half the height at the longitudinal midpoint of the ellipse.

5. In a cement based composition for building structures with increased hardness, the improvement comprising the addition to about one part by volume dry cement and about two parts granular sand or grog:

about three parts ceramic aggregate pellets, said aggregate pellets being formed from a premix of vitreous clay and processed shredded and dried organic garbage mulch in the ratio of one part clay to three parts organic garbage mulch by volume, the pellets being fired at a temperature higher than the vitrification point of said vitreous clay.

6. The composition according to claim 5 wherein said pellet is generally elliptical, having a flat bottom surface a rounded top surface, and rounded ends, said ends having a height one half as great as the height of said pellet's longitudinal midpoint.

7. A method for producing a ceramic composition to make cement for roadways comprising:
 (a) providing a dried organic mulch made from processed shredded organic garbage;
 (b) mixing vitreous clay with said organic mulch, said clay having a fixing temperature of from about cone 03 (2000 degrees F.) to about cone 14 (2400 degrees F.);
 (c) shaping said mixture of step (b) into pellets, each said pellet being generally elliptical with a rounded top surface, rounded ends, and a generally flat bottom surface, said ends having a height one half as great as the height of said pellet's longitudinal midpoint;
 (d) firing said pellets at a temperature at least 100 degrees F. above said clay's vitrification point to cause said pellet surface to melt;
 (e) mixing dry cement, grog, and said pellets in the general ratio of one part cement to two parts grog to three parts pellets; and
 (f) mixing the mixture of step (e) with water to form concrete.

8. The method according to claim 7, further comprising the step of:
 (g) aligning the pellets into stratified overlapping layers when said concrete is placed.

9. The method according to claim 8, wherein said aligning step is accomplished by flowing said concrete through spaced obstructions past which the pellets must slide, thereby aligning the pellets into strata.

* * * * *